United States Patent Office 3,511,150
Patented May 12, 1970

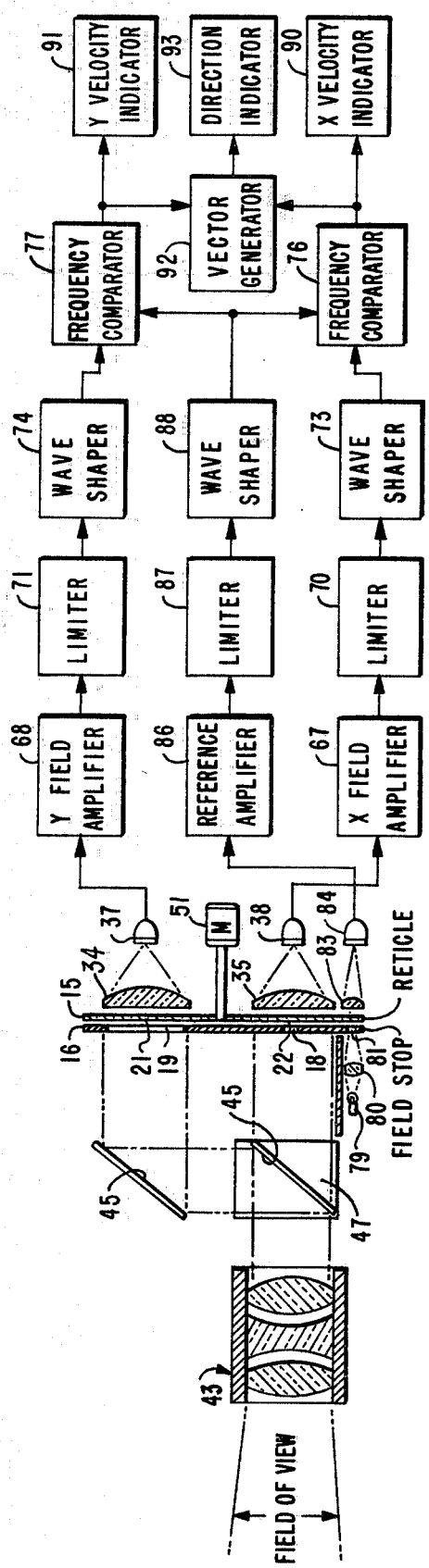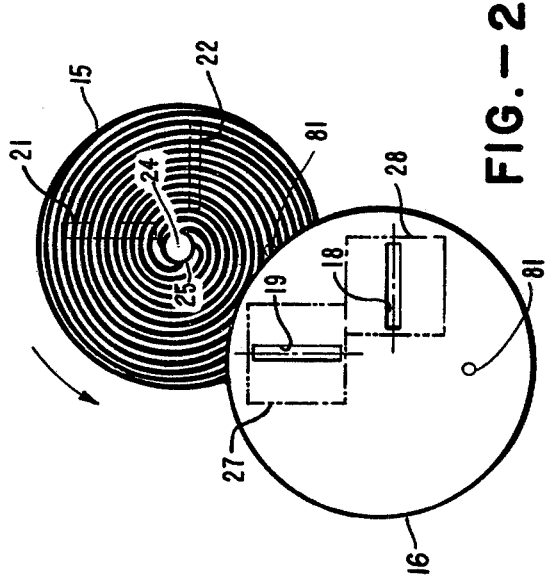

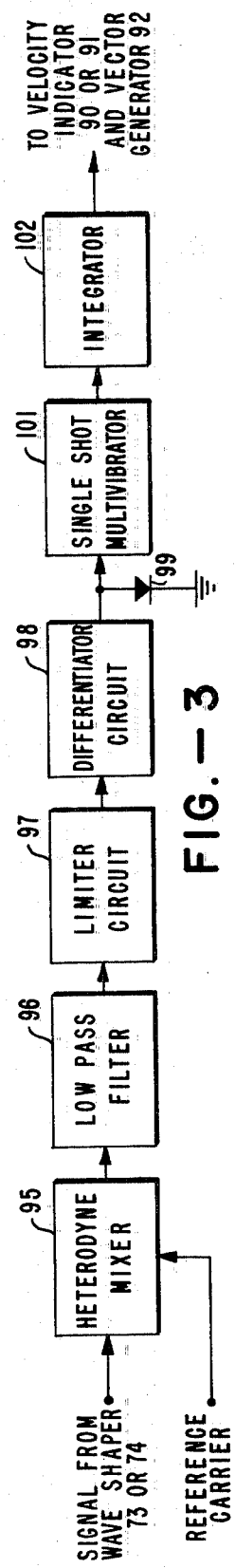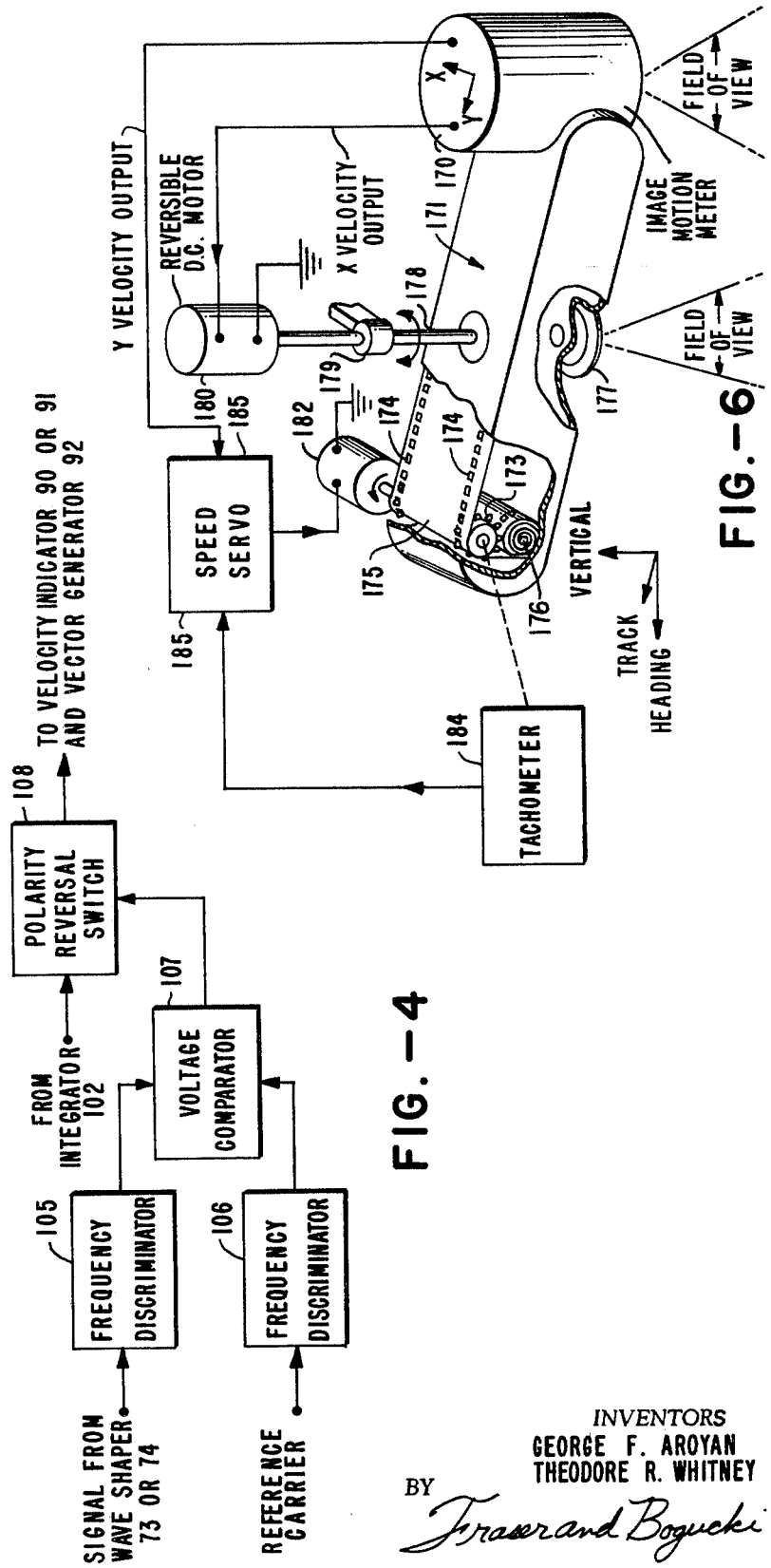

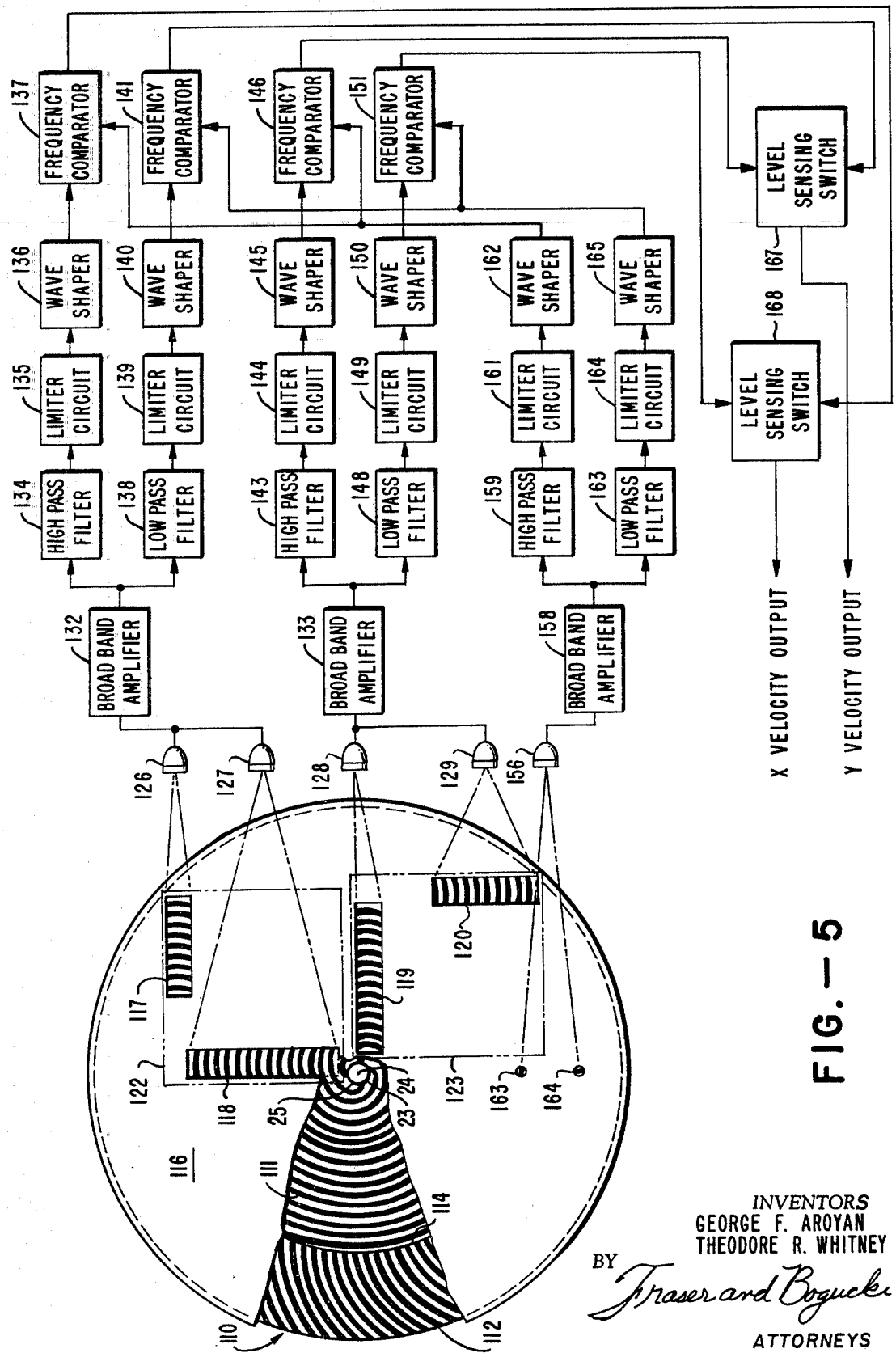

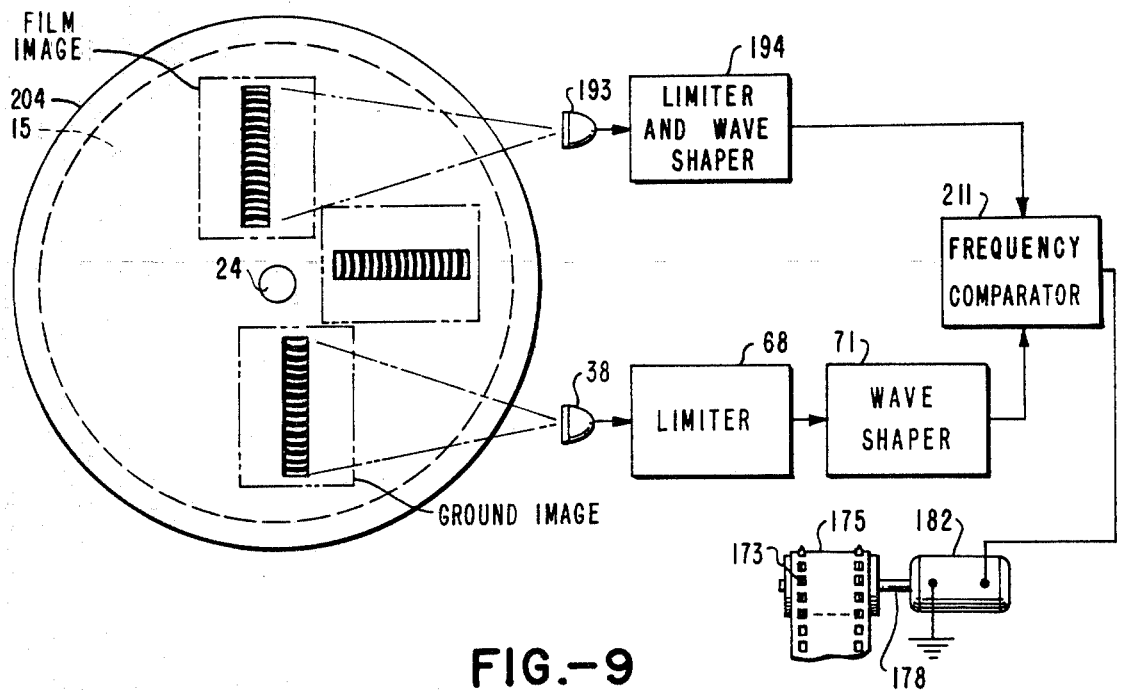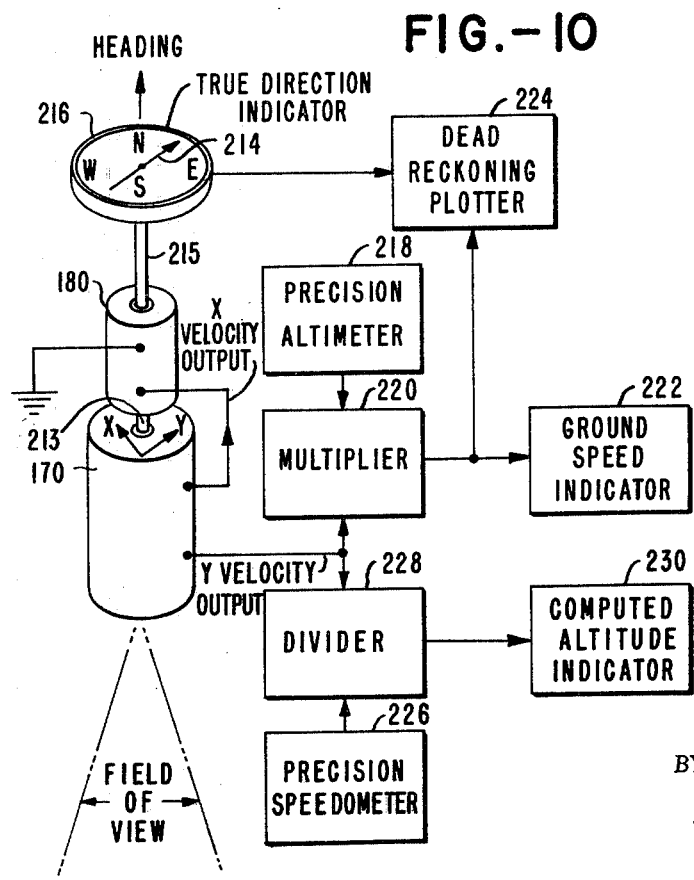

3,511,150
IMAGE MOTION DEVICES
Theodore R. Whitney and George F. Aroyan, Woodland Hills, Calif., assignors to Theodore R. Whitney, doing business as Pacific Infrared Systems Company
Filed Jan. 13, 1966, Ser. No. 520,460
Int. Cl. G03b 29/00
U.S. Cl. 95—12.5         7 Claims

ABSTRACT OF THE DISCLOSURE

The device is one for measuring image motion, as for an aerial camera or navigational systems. It measures image motion in two orthogonal directions as a frequency shift from a fixed carrier frequency. It comprises a rotating reticle having one or more involute patterns in front of which is positioned a mask having two slots at right angles to one another, through which the moving image beam from the landscape passes to go through the rotating reticle and to a photocell located behind each slot in the mask.

This invention relates generally to devices for measuring image motion, and improved aerial photographic and navigational systems employing such devices, and more particularly to improved devices for accurately measuring image motion optically.

Devices for measuring image motion, sometimes referred to as V/H (velocity/height) meters, have various applications, particularly in aerial photography and in measuring relative speed and direction of travel in aircraft, missiles or space vehicles. Image motion can generally be described as corresponding to the angular change in the line of sight produced as an object moves across an observer's field of view. To an observer, a moving object has an angular velocity directly proportional to its actual velocity normal to the observer's line of sight and inversely proportional to its distance from the observer along the line of sight. An image motion meter is intended to measure the direction and velocity of this angular movement.

Image motion has long been recognized as the major factor limiting the quality of aerial photography. To obtain the high resolution often required in modern aerial photography, the blurring effects of image motion must be minimized. A high speed shutter can be used to reduce the blurring effect of image motion, but has the obvious adverse effects of requiring increased lens aperture and higher speed film. The only real solution is to move the film so that the image remains focused at exactly the same location on the film.

Precise image motion correction in an aerial photographic system requires that the film be moved at exactly the same speed and in exactly the same direction as the moving image. Of course, under most circumstances, the major component of image motion occurs in the direction of the aircraft heading. Therefore, many previous aerial photographic systems have merely compensated for image motion only along the aircraft heading. However, skewing of the aircraft due to cross winds or the like can often result in significant image motion transverse to the heading that cannot be ignored if good photographic resolution is to be obtained under all conditions.

Many of the problems encountered in previous attempts to provide precise image motion correction are the direct result of shortcomings inherent in the methods used for measuring image motion. In some systems, complicated image correlation techniques are used to match two radar or visual images taken along different lines of sight in the direction of the aircraft heading. If the direction of the aircraft remained constant along its heading, the image first appearing in the forward line of sight can subsequently be correlated with an identical image when the scene appears in the other line of sight. Since the vertical angle between the two lines of sight is known, the image motion could then be determined from measuring the time lapse required for correlation. However, such image correlation systems are complicated, expensive and tend to be unreliable at very high or very low altitudes. At very low levels, images may be very difficult to correlate because of the varying perspective along the different lines of sight. On the other hand, at higher altitudes, radar image details will tend to become somewhat obscured for correlation purposes so that more complicated visual correlation techniques are required. Also, since image motion is slow, the long time lapses necessary for image correlation at high altitudes are difficult to measure accurately or continuously using conventional time integration and correlation techniques. Moreover, these image correlation techniques are practically useless over water and other terrain lacking distinctive features.

Other systems have employed stationary reticle arrangements having alternate transparent and opaque parallel spokes arranged in a pattern along the direction of heading of the aircraft. As the image moves, the reticle spokes chop the visual detail so that an associated photosensitive device generates an output frequency proportional to the velocity of the image motion normal to the parallel spokes. In some systems, the spokes are disposed diagonally on opposite sides of a reticle center line parallel to the heading to form a chevron pattern. Separate photosensitive devices, each made responsive to the chopping of the image detail on only one side of the reticle center line, produce first and second output frequencies. The average of these two generated frequencies is directly proportional to the component of image motion velocity along the aircraft heading, while the difference between these two frequencies indicates the component of the image motion velocity transverse to the aircraft heading. However, at very high altitudes, where image motion is slight, both output frequencies may approach zero so that accurate frequency detection is all but impossible using conventional circuit techniques. Moreover, such stationary reticle systems cannot distinguish the image motion of the ground from that produced by clouds at various heights. As a result, occasional clouds appearing in the field of view can produce large output frequency variations.

Accordingly, it is an object of the present invention to provide an improved device for accurately measuring the direction and velocity of image motion.

Another object of the present invention is to provide an improved apparatus for achieving precise image motion correction in aerial photography systems to improve image resolution.

A further object of the invention is to provide an image motion meter capable of discriminating between the ground and occasional clouds within the field of view.

Yet another object of the present invention is to provide an inexpensive image motion meter capable of measuring the direction and velocity of image motion with great accuracy over a wide range of speeds.

Yet a further object of the invention is to provide inexpensive aircraft instrumentation capable of indicating the actual direction of travel, and for computing ground speed and altitude above the terrain.

These and other objects are accomplished in accordance with the invention by providing a unique arrangement capable of measuring image motion in two orthogonal directions as a frequency shift from a fixed carrier frequency. The arrangement uses a rotating reticle having one or more involute patterns consisting of alternate transparent and opaque spokes. A field stop, or mask, is located immediately in front of the reticle and has two narrow rectangular apertures disposed at right angles to one another through which a portion of the image is projected onto the reticle. Each aperture is located relative to the axis of rotation of the reticle so that the narrow rectangular portion of the image projected through the aperture onto the reticle has its longitudinal center line tangent to the base circle from which the involute pattern is generated. Since a line drawn tangent to the base circle of an involute pattern is perpendicular to each of the spokes at their intersection, rotation of the reticle produces the effect of an endless procession of evenly spaced spokes moving along the length of the narrow rectangular image strip.

A separate photosensitive detector is placed behind each aperture of the reticle to respond to the light passing through the transparent spokes, as the procession of evenly spaced spokes chop the image detail in the narrow image strips. When there is no relative image motion, the photosensitive detectors generate a fixed carrier frequency as the spokes chop the stationary image detail at a constant modulating frequency. On the other hand, if the image detail is moving in either direction along the length of the narrow rectangular apertures, the output obtained from the associated photosensitive detector differs in frequency from the fixer carrier by an amount indicative of the image motion in the respective orthogonal direction. If the image detail moves with the spokes, the output frequency is slightly below the fixed carrier and, if the image motion is against that of the spokes, the output frequency is slightly higher. The output frequency of each detector is compared with a carrier reference frequency to determine the direction and magnitude of the frequency shift, thus giving an accurate measure of the speed and direction of image motion in both orthogonal directions along the two field apertures.

The accuracy of the image motion measurement can be made independent of slight variations in the rotational speed of the reticle by focusing a small light spot opposite another photosensitive detector on a portion of the reticle pattern outside the area of the narrow rectangular images. The rotating reticle chops the spot so that the photosensitive detector generates a carrier reference frequency directly related to the rotational speed of the reticle. This carrier reference frequency is then compared with the output frequencies in separate synchronous detector circuits, which generate output signals representative of the frequency differences, and therefore the image motion rates in the respective orthogonal directions.

In order to accurately measure image motion in different speed ranges, the reticle may have two or more separate involute patterns, each providing a different chopping frequency. A reticle with two involute patterns has a high frequency outer involute pattern whose base circle may define the outer limits of the low frequency inner involute pattern. If the spokes in the inner and outer patterns have the same width, the outer pattern contains a great many more spokes that chop the image at a higher frequency. Two additional narrow rectangular apertures are provided in the associated field stop to project narrow rectangular images on the outer involute pattern tangent to its base circle, and at right angles to one another. As the reticle rotates, the spokes of the outer pattern appear to move in an endless procession down the length of these narrow rectangular apertures, but at a much higher speed than the inner spokes. A small light spot focused on a portion of the outer involute pattern may be used to generate the high frequency carrier reference needed for synchronous detection. Detection circuitry is essentially duplicated for both the high and low frequency channels.

In accordance with another aspect of this invention, the measurements of image motion can be employed in a unique manner for automatically controlling the direction and speed of movement of photographic film to compensate for image motion in an aerial photographic system.

In a preferred embodiment, the transverse component of image motion operates through a null seeking servo system to align the camera so that the film moves in the actual direction of travel of the aircraft as the transverse component image motion on the film is reduced to zero. The image motion measuring device is rotated with the camera to align the various elements, thus also reducing the measured transverse component of image motion to zero. Since only the longitudinal component remains, it can be measured to determine total image motion occurring along the actual flight path, thus achieving precise image motion correction.

In accordance with yet another aspect of this invention, an image motion meter may also be used to monitor film speed and thus improve the accuracy of the image motion correction. The edge of the film containing the sprocket holes can be illuminated from an infrared source, for example, properly shielded and filtered to prevent exposing the film or disturbing the latent image. The film sprocket holes serve as sharply detailed optical features to be chopped by the involute reticle. Image motion can then easily be matched with film motion to insure precise automatic image motion correction. In a like manner, any detail on the moving platen can be used as an object at the film plane. Servo systems operating on the null balance principle compare film motion with image motion to obtain a film velocity error signal that is needed to control film speed without the necessity of directly measuring either film or image motion anywhere in the system.

In accordance with a still further aspect of the invention, image motion devices of this type are valuable as a navigational aid particularly in determining the true direction of aircraft travel and the drift rate. In addition, an accurate image motion measurement can be combined with altitude information to compute true ground speed, or combined with ground speed measurements to compute actual altitude above the terrain.

These and other aspects of the invention can best be understood by referring to the following detailed description taken in conjunction with the accompanying drawings, in which:

FIG. 1 is a simplified schematic diagram of a preferred form of an image motion meter in accordance with the invention having a single speed range, wherein the various optical elements are illustrated in a side sectional view and the detection circuit is illustrated in block diagram form;

FIG. 2 is a simplified full front view of a reticle and field stop arrangement for use in the preferred embodiment of FIG. 1 showing the images projected thereon;

FIG. 3 illustrates in block diagram form one preferred type of frequency comparator circuit that may be used in the present invention for generating an output signal indicative of the frequency shift caused by image motion in a given orthogonal direction;

FIG. 4 illustrates in block diagram form a simple circuit used in conjunction with the frequency comparator circuit of FIG. 3 for determining the sense of the image motion in a given direction;

FIG. 5 is a schematic diagram of another preferred embodiment of an image motion meter in accordance with the invention that has both high and low frequency speed ranges;

FIG. 6 is a schematic illustration of an automatic image motion compensation system for aerial photography in accordance with the invention, wherein the camera casing is partially broken away to show a portion of the film path;

FIG. 9 illustrates schematically an alternative form of an image motion compensation system in accordance with the invention wherein the film speed is directly matched with the image motion; and FIG. 10 illustrates schematically an airborne navigational system employing image motion instruments in accordance with this invention.

Figure 7:
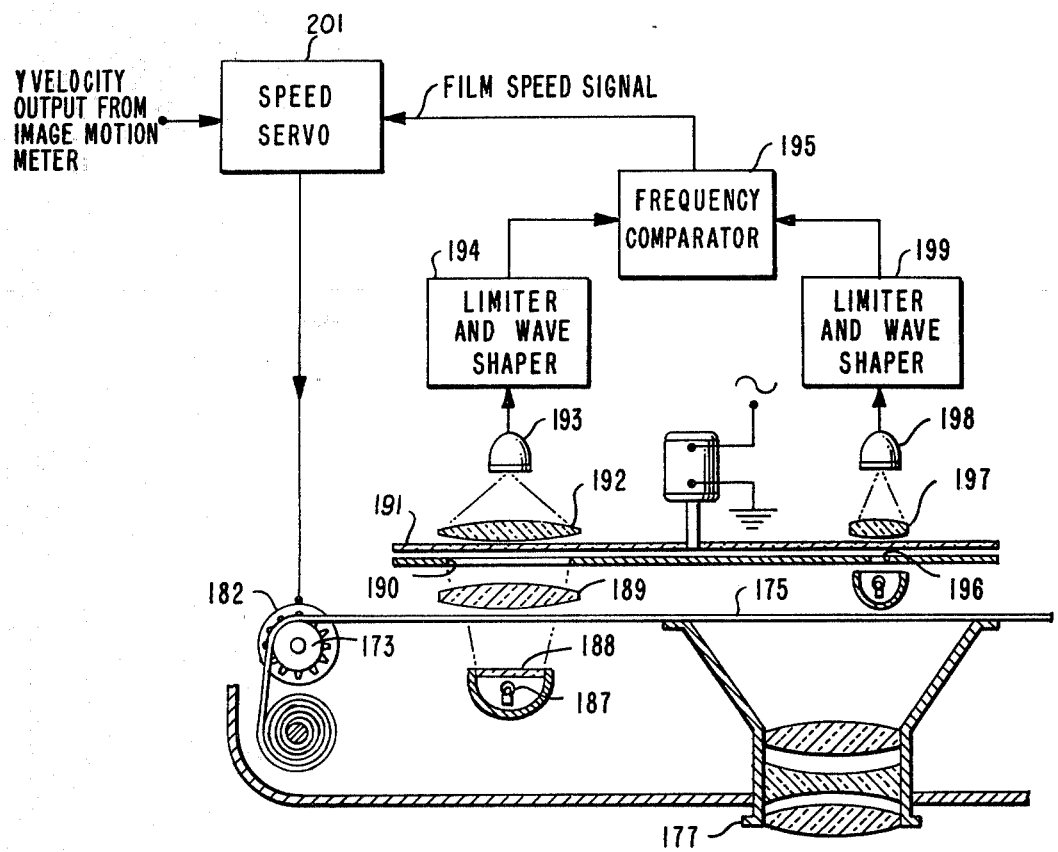
FIG. 7 is a schematic and block diagram illustration shown partly in section, of a preferred form of photographic image motion compensation system, wherein film speed is determined by an image motion meter in accordance with this invention.

Prior to undertaking a detailed explanation of the invention, certain general principles relating to radiant energy detection system should be appreciated. The visual detail content of an image is described mathematically in terms of "space frequency" content. The term "space frequency" denotes the variations in the light intensity per unit of displacement in a given direction on the image and is a function of inverse space in the same manner as time frequency is a function of inverse time. For example, if light intensity be measured along a line as the line is scanned across the image, changes in the image details intersected by the moving line cause variations in the measured intensity. The frequency of these measured variations depends on the size and resolution of the image details. The space frequency distribution in a given direction is illustrated by plotting the intensity of the variation against the inverse of the distance moved by the scanning line. For any given image, a three dimensional plot of the complete frequency spectrum can be constructed by plotting the intensity variations on a vertical scale against the reciprocal of the scanning distance along lines radially positioned, in accordance with the scanning direction, from a common origin denoting zero space frequency. The resulting three dimensional plot of the space frequency spectrum is mathematically descriptive of the visual content of the image. For example, if the image has substantially no detail, such as a picture of a featureless cloud, a three dimensional plot of the space frequency spectrum would consist of a spike at the common origin of zero or "DC" space frequency. If the picture has high detail content, the plot of the space frequency spectrum would be more flattened, gradually slopping downward from a maximum at the origin and extending outward to higher space frequencies in all directions.

In radiant energy detection systems, it is a common practice to use a moving reticle consisting of alternate transparent and opaque regions to time frequency modulate or chop the radiant energy in the image. In terms of space frequency, the moving reticle acts as a space frequency filter since the space frequency content of the image is multiplied by the space frequency distribution of the overlying reticle pattern. Thus, for a product signal to be generated, the space frequency spectrum of the image must extend across the space frequency band pass of the reticle.

The space frequency spectrum for a reticle pattern consisting of an endless procession of alternately opaque and transparent parallel spokes of equal width is depicted in a three dimensional plot as a straight narrow ridge displaced from the common origin at its point of closest approach by the reciprocal of the combined width of adjacent opaque and transparent spokes. Therefore, if such a reticle is used to chop a perfectly bland, featureless image, having its frequency spectrum concentrated in a spike at the origin, no modulated output would obtain since no part of the space frequency spectrum of the image coincides with the narrow ridge representing the narrow banded filtering action of the reticle. Thus, no matter what the space frequency spectrum of the image chopped by such a reticle, the modulated output signal obtained is very narrow banded in the space frequency passband determined by the spacing of the spokes. The distribution of the space frequency power spectrum is not affected by motion of the image, but the time frequency modulation produced by a chopping reticle changes if the image motion is with or against the moving pattern of the reticle. For example, a lower time frequency is generated when the image moves in the same direction as the reticle, whereas a higher time frequency is generated when the image moves in the opposite direction from the reticle.

In practical terms, this means that a radiant energy detection system making use of such a reticle is more sensitive to highly detailed portions of the image than to features lacking in details, such as clouds, and that the time frequency generated by the chopping action of the modulating reticle can be used to detect image motion in the direction of spoke travel. The practical aspects of these theoretical considerations are best appreciated by considering the following detailed description of the preferred embodiments of the invention.

Referring now to FIGS. 1 and 2, an image motion meter in accordance with the invention consists of an optical system for focusing the image, a moving reticle arrangement for chopping the image detail with an endless procession of parallel spokes in each of two orthogonal directions, and appropriate detection circuitry for converting the time frequency modulated radiant energy in both orthogonal directions into output signals indicative of the speed and direction of the image motion. These elements should be mounted within an enclosing (not shown) structure that excludes all extraneous light from the optical system.

Preferably, the optical system provides two identical images of the same scene so that each can be chopped by a separate endless procession of parallel spokes moving in one of two orthogonal directions. The chopping spokes should be located exactly in the focal plane of the respective image. The desired chopping operation is most easily accomplished, in accordance with the preferred form of the invention, by employing a single rotating involute reticle 15 that chops an incident image at a constant very narrow space frequency, as contrasted with the broad band of chopping frequencies resulting from other kinds of rotating reticles. A field stop or mask 16 located immediately in front of the rotating reticle 15 has two narrow rectangular openings or slits 18 and 19 through which only a narrow strip illustrated by the dashed lines 21 and 22 in FIG. 2 from each image is focused at a selected location on the reticle 15 relative to its axis of rotation 24. The slits 18 and 19 are perpendicular to one another with their respective longitudinal center lines tangent to the base circle 25 on the reticle 15 used in generating the involute pattern. For best results, the two images (illustrated by dashed lines 27 and 28) should be centered on the respective apertures 18 or 19 so that the two strips 21 and 22 that are focused on the reticle 15 would cross one another in the center if the two images were superimposed. In this way, the image details in one strip will be as close as possible in the overall scene to the details contained in the other strip.

As shown in FIG. 2, the rotating involute reticle 15 has alternate adjacent opaque and transparent areas of equal width that extend radially and circumferentially outward from the base circle 25, from which the involute pattern is generated. It should be noted that the areas on the reticle referred to herein as transparent and opaque are only relatively transparent and opaque, and that the chopping efficiency of the reticle depends upon the difference in transparency or apaqueness between adjacent areas. The dividing lines between the adjacent opaque and transparent areas closely approximate an involute, which by definition is a curve traced by any point of a perfectly flexible inextensible thread kept taut as it is wound or unwound from another curve, in this case the base circle 25. In other words, the alternate opaque and transparent areas are defined by parallel involute curves. The involute pattern of a circle is unique in that any line drawn tangent to the base circle is perpendicular at its point of intersection to each involute curve generated from the base circle. Therefore, in the narrow rectangular strips 21 and 22 opposite the narrow rectangular apertures 18 and 19 in the field stop 16, the involute spokes are parallel to one another and roughly perpendicular to the longitudinal center line of the strip. As the reticle is rotated in the counterclockwise direction, the spokes as seen through the field stop openings 18 and 19 appear as an endless procession of narrow rectangular bars moving outward along the strips 21 and 22 to chop the image details, thus giving the desired narrow banded space frequency filtering action and time frequency modulation.

On the other side of the reticle 15, opposite the narrow rectangular apertures 18 and 19 in the field stop 16, a pair of planoconvex lenses 34 and 35 are positioned to concentrate the light in each strip that passes through the transparent areas of the reticle onto a respective photosensitive detector 37 or 38. Each of the photosensitive detectors 37 and 38 contains an appropriate light sensing element, such as photoelectric multiplier cells or indium antimonide cells that respond to wavelength in the visible region or up to about 4.5 microns, well within the infrared region. The output signal obtained from cells such as these is frequency modulated in accordance with the chopping action of the spokes on the image details. If the image is stationary, the detectors generate a modulated output at a fixed carrier frequency equal to the rotation rate of the reticle times the number of spokes. However, as previously explained, any image motion along the strips results in a frequency shift in the detector output directly proportional to the image motion velocity in the respective orthogonal direction, with the image being chopped at a higher frequency when the image motion along the strip is against that of the spokes, and at a lower frequency when the details move along the strip with the spokes.

All optical components used in focusing the two images onto the reticle should be of high quality to insure the best possible resolution of details. As shown in FIG. 1, a single objective lens arrangement 43 can be shared in producing the two images. A first set of parallel mirrors 45 uses one-half of the lens aperture to reflect one image onto the reticle, while the other half of the lens aperture can be used by another set of parallel mirrors 47 to reflect an identical image on the reticle circle 90° removed from the first. As previously mentioned, the rotating reticle 15 must be located precisely in the focal plane for both images. Longitudinal light baffles (not shown) keep light in the two imaging paths entirely separated.

The involute reticle 15 should be a flat polished optical surface. Preferably, the opaque pattern is deposited on the front surface of a transparent glass substrate of high photographic quality. For simplicity of illustration, the reticle 15 is shown in FIG. 2 as having only four relatively wide opaque involute spokes. In an actual embodiment, the involute spokes would be thinner and more numerous. For instance, reticles having thirty opaque involute spokes, each 0.0002 of an inch wide and spaced 0.0004 of an inch from center to center, would be suitable in most instances for precision measurement of image motion.

The center of the reticle 15 is attached to a shaft that is mounted for rotation by suitable low friction bearings (not shown). A motor 51 is mechanically linked to drive the shaft at a substantially constant speed of rotation. Assuming that the reticle rotates at 3600 r.p.m., that is, sixty cycle per second, each spoke of the thirty spoke reticle chops each point along the slot sixty times per second, so that the carrier frequency is 1800 cycles per second. Accordingly, when the image is stationary, the output frequency from both sensors 37 and 38 is 1800 cycles per second, the carrier frequency. When the image moves, the output frequency of the sensors shifts accordingly. For example, an image motion velocity of 0.01 of an inch per second along either strip across the 0.0002 of an inch wide spokes results in a twenty-five cycle per second frequency shift, to either 1825 or 1775 cycles per second, depending upon whether the image motion is with or against that of the spokes. This frequency shift is then measured by appropriate frequency comparison circuitry to determine the velocity and direction of image motion.

Image motion along the slot 18, illustrated as being horizontally aligned, can be considered as being in the X direction, whereas image motion along the slot 19, illustrated vertically, can be considered the Y direction. Output signals obtained from the photosensitive detector cells 37 and 38 have a somewhat irregular waveform and relatively low power. Accordingly, these signals are first amplified by respective X field or Y field amplifiers 67 and 68, both having a broad banded frequency response for handling the signal frequencies within the maximum frequency deviation limits. The respective amplifier outputs are then applied through amplitude limiter circuits 70 and 71 that change the irregular waveform to an essentially square wave output. Respective wave shaper circuits 73 and 74 responsive to the square wave outputs are then used to provide an appropriate waveform, such as a sinusoid that can be utilized in frequency comparator circuits 76 and 77, wherein the frequencies generated in the X and Y directions are compared with the fixed carrier reference frequency to measure the frequency deviation resulting from image motion.

The accuracy of the frequency difference measurement by the frequency comparator circuits 76 and 77 requires that the carrier reference signal, used for comparison purposes, be generated at the exact frequency at which the rotating reticle 15 chops stationary image detail. This carrier reference signal could be derived from a fixed frequency source if the speed of rotation of the reticle 15 were precisely controlled. However, preferably the proper carrier reference frequency is derived from the rotating reticle itself. As shown in FIG. 1, light from a lamp 79 is focused by a convex lens 80 through a small circular aperture 81 as a stationary spot on a remote area of the rotating involute reticle 15. Preferably, the light spot should be kept as small as possible and, in any event, should not have a diameter greater than the thickness of one of the involute spokes. A small plano-convex lens 83 focuses the light spot as it passes through the transparent areas of the reticle, onto a light sensitive element of a photosensitive detector 84. The output from the photosensitive detector 84, which is amplified by a reference amplifier 86, is then operated upon by a limiter circuit 87 and a wave shaper circuit 88 to provide a regular waveform for use in the frequency comparator circuits 76 and 77. By generating the carrier reference frequency directly from the rotating reticle in this manner, the accuracy of the image motion measurements in both orthogonal directions is made independent of minor variations in the rotational speed of the reticle 15, thus eliminating any need for precise speed control. The signal obtained from the frequency comparator 76 can be applied directly to an appropriate X velocity indicator 90 to display the measured velocity of image motion in the X direction using appropriate units. Likewise, the signal obtained from the other frequency comparator 77 can be applied to a Y velocity indicator 91 to display the measured image motion velocity in the Y direction using appropriate units. Also, both signals can be combined in a conventional vector generator device 92 to determine the true velocity and direction of image motion. The angular position of the vector generated can then be displayed separately by an appropriate direction indicator 93 to give the true direction of relative movement between the image motion meter and the objects within the field of view that form the image details.

The particular type of frequency comparison circuit used depends on the accuracy desired and the cost limitations imposed. However, in most instances, the circuit illustrated in FIG. 3, and hereinafter described, is preferred because it provides a relatively high degree of accuracy using low cost conventional circuitry. With this arrangement, the signal obtained from the respective photosensitive detector 37 or 38 is mixed with the reference carrier in a heterodyne mixer 95 to derive a beat frequency equal to the frequency difference between the two applied signals. A low pass filter 96 excludes from the mixer output those frequencies above the maximum contemplated beat frequency. A limiter circuit 97 squares off the waveform, leaving only the positive and negative zero axis crossings. A differentiator circuit 98 then generates a positive voltage spike that is shunted to ground by a diode 99, for each positive zero axis crossing, and a negative voltage spike for each negative zero axis crossing to trigger a single shot multivibrator 101 once each cycle of the beat frequency signal. Each time the single shot multivibrator 101 is triggered by a negative voltage spike it applies a pulse of fixed amplitude and duration, to an integrator 102. The duration of the pulses generated by the single shot multivibrator 101 should be less than the minimum cycle interval encountered at the highest contemplated beat frequency. On the other hand, the time constant of the integrator 102 should be sufficient to cover at least several cycles of the lowest beat frequency of any significance. Thus, using relatively simple circuitry throughout, a frequency comparator circuit of this type is capable of accurately converting even small frequency differences between the two signals into an output level indicative of the velocity of image motion in the respective orthogonal directions.

The integrator 102 may be a simple capacitive type integrator or a digital counter with a fixed counting interval. For most applications the capacitive type integrator such as an operational integrator, is preferred since it provides a continuous DC output indicative of image motion velocity. However, much longer integration intervals are possible with counter arrangements.

While the frequency comparator circuit shown in FIG. 3 accurately measures the frequency difference between two signals, it is unable to determine the sense of that frequency difference because the phase and frequency of both signals are subject to random variation. In most applications, however, the frequency difference in at least one orthogonal field is always of the same sense and thus need not be determined. For example, if the Y orthogonal is aligned with the track or heading of an aircraft, image motion produced in that direction always occurs in the same sense. However, the sense of the image motion produced in the X direction, which would be transverse to the track or heading might depend on whether a prevailing crosswind came from one side or the other. This sense ambiguity is resolved by determining whether the frequency of the X field signal is higher or lower than the reference carrier frequency.

Referring now to FIG. 4, this determination is made using a rather simple circuit arrangement having two conventional frequency discriminators 105 and 106 and a voltage comparator 107. The X or Y field signal frequency provided by the wave shaper 73 or 74 is applied to the frequency discriminator 105, and the reference carrier waveform from the wave shaper 88 is applied to the frequency discriminator 106. Both frequency discriminators 105 and 106 have substantially identical frequency response characteristics centered at a common frequency, normally the nominal reference carrier frequency, to generate a DC voltage output having an amplitude proportional to the frequency deviation of the input from the center frequency and a polarity indicative of the direction of the frequency deviation. For the purpose of this invention, the frequency response characteristics of the two discriminators 105 and 106 need not be linear, nor need the center frequency for each be exactly the same. However, the frequency response characteristics for these discriminators should be identical, or as close to identical as possible, at least in the narrow range of reference carrier frequency deviation resulting from slight variations in the rotational speed of the reticle. The shape of the frequency characteristic for the discriminators 105 and 106 is relatively unimportant outside this narrow range, except that the output amplitude from the discriminator 105 resulting from any frequency outside this range, but within the maximum frequency deviation limits resulting from image motion, must not be less than the maximum output amplitude produced by any frequency within the narrow range. This is permissible since the frequency discriminator 106 does not operate outside of the narrow range of frequency deviation in the reference carrier and, if the input frequency to the discriminator 105 is outside of this narrow range, it is sufficient if the output signal merely indicates whether the frequency is higher or lower.

The amplitudes of the DC output signals from the discriminators 105 and 106 are compared in a voltage comparator circuit 107, normally just a simple center tap resistor. The resistor tap can be made adjustable to permit appropriate balancing if the center frequency response of the two discriminators happen to be slightly different. The tap is adjusted so that the voltage comparator output will be zero when there is no image motion. If the input signal frequency to the discriminator 105 is higher than the reference carrier frequency due to image motion in one sense, the voltage comparator 107 produces an output of one polarity; whereas, if the input signal frequency to discriminator 105 is lower, the voltage comparator output is of the opposite polarity. As shown, the voltage comparator output may be used to operate a simple polarity reversal switch 108 and thus control the polarity of the DC output signal from the integrator circuit 102. In this way, the output signal from the frequency comparator circuits 76 and 77, when applied to the vector generator 92 and the velocity indicators 90 and 91, has an amplitude proportional to the measured image motion velocity in the respective orthogonal direction and a polarity indicative of its sense.

Referring now to FIG. 5, it is frequently necessary to measure both small and large image motions accurately. This is frequently the case in modern aerial reconnaissance where a single aerial photographic system is employed to photograph large areas from high altitudes and also to obtain close-up photographs on high speed low level runs. Moreover, the cross track vector image motion is normally very much smaller than the component along the track, and the image motion meter is often required to measure these two components separately. Image motion meters in accordance with the present invention can accurately measure image motion in several different speed ranges with a minimum of additional equipment. A reticle 110 is shown with an inner involute pattern 111 and an outer involute pattern 112. The inner involute pattern 111 corresponds to that illustrated in FIG. 2, which in a practical embodiment would probably contain about thirty separate opaque involute spokes extending out from the small base circle 25. The outer involute patten 112 has a much greater number of separate involute spokes generated from a base circle 114 that surrounds the inner involute pattern. For simplicity, the outer pattern is illustrated with approximately one hundred and twenty opaque spokes, whereas in a practical embodiment of the outer pattern would contain approximately twelve hundred such spokes. An opaque field stop or mask 116, a substantial portion of which is broken away to show the reticle pattern behind, contains four narrow rectangular apertures or slits 117, 118, 119, and 120. The apertures 117 and 120 are perpendicular to one another with their longitudinal center lines tengent to the outer base circle 114, and the apertures 118 and 119 are perpendicular to one another with their longitudinal center lines tangent to the inner base circle 25. As previously explained, the optical system focuses two identical images in the plane of the rotating reticle 110. As shown by the dash lines, one image 122 covers the rectangular apertures 117 and 118, while the other image 123 covers the rectangular apertures 119 and 120 so that a narrow rectangular portion of each image impinges on both the inner and outer involute patterns at 90° to one another. Alternatively, in another embodiment, four separate optical systems may be used, forming four sensibly identical images, one on each slot aperture. As the reticle rotates, the image detail focused through the apertures 117 and 120 on the outer pattern are chopped at a much higher time frequency than those focused on the inner pattern but at an identical space frequency, since the spokes in each pattern are of the same width and separation. Assuming that the twelve hundred opaque spokes in the outer pattern are rotated at sixty cycles per second, the chopping frequency is 72,000 cycles per second, as compared with 1800 for the inner pattern containing only thirty spokes. The light being chopped by the reticle in each of the four strips is focused on a respective photosensitive detector cell 126, 127, 128 and 129. The output signals from the photosensitive detector cells 126 and 127, that is, the high chopping frequency in the X direction and the low chopping frequency in the Y direction, may be combined as a single input to a broad band amplifier 132 capable of handling both frequency ranges. Likewise, the outputs from the photosensitive detectors 128 and 129, that is, the low chopping frequency in the X direction and the high chopping frequency in the Y direction, may likewise be combined as a single input to a broad band amplifier 133 capable of handling both frequency ranges. Alternatively, the two frequencies can be combined by use of an appropriate optical system for focusing the light chopped in the two adjacent strips onto a single photosensitive detector cell, thus reducing the number of such cells to two, instead of four. The high and low frequencies do not overlap so that there are effectively two separate channels that can be multiplexed together and later separated.

The combined signals are separated at the output of the amplifiers 132 and 133 by high and low pass filtering. The high frequency X field component from the amplifier 132 is separated by the high pass filter 134 and applied through amplitude limiter and wave shaper circuits 135 and 136 to a frequency comparator circuit 137, while the low frequency wide field component is separated by the low pass filter 138 to be applied through the amplitude limiter and wave shaper circuits 139 and 140 to a frequency comparator 141. Likewise, the high frequency Y field component separated by a high pass filter 143 is applied through the amplitude limiter and wave shaper circuits 144 and 145 to a frequency comparator circuit 146, while the low frequency X field component is separated by a low pass filter 148 to be applied through amplitude limiter and wave shaper circuits 149 and 150 to a frequency comparator circuit 151.

The low frequency carrier reference is derived as before by focusing a tiny light spot through a small circular opening 163 in the field stop 116 onto the inner reticle pattern 111. Likewise a high frequency reference is derived by focusing another tiny light spot through a small circular aperture 164 in the field stop 116 onto the outer reticle pattern 112. These light spots are chopped by the rotating reticle 110, and in this case an appropriate optical system (not shown) focuses the light passing through the transparent portions of the reticle onto a single photosensitive detector cell 156, or if desired onto separate photocells in the manner illustrated for sensing chopping of the image details. The high and low frequency reference are effectively multiplexed together to be amplified by a single broad band amplifier 158. The amplified high frequency reference is then separated by a high pass filter 159, and is applied through the amplitude limiter and wave shaper circuits 161 and 162 to acquire a regular high frequency waveform for use in the frequency comparator circuits 137 and 146. Likewise, the low frequency reference signal channel is separated by a low pass filter 163, and then applied through amplitude limiter and wave shaper circuits 164 and 165 for use in the frequency comparator 141 and 151.

The output from each frequency comparing circuit has an amplitude proportional to the measured frequency difference, and if necessary, a selected polarity indicative of the sense of the frequency shift. Normally all four frequency comparator circuits are designed to generate equal output amplitudes for a given frequency deviation, but the output amplitudes may be appropriately scaled to suit a particular application. Normally a single indicator or control device is used for each orthogonal direction so that either the high or low frequency channel output must be selected. For this purpose conventional level sensing switches 167 and 168 can be used for selectively coupling the output from either the high or low frequency channel in the particular orthogonal direction to the respective output device. For example, the level sensing switch 167 may consist of a simple two-position switch that normally couples the Y low frequency channel output from the frequency comparator circuit 141, to an appropriate output device. Whenever the output from the frequency comparator 146 exceeds a given amplitude in either polarity, then the switch responds to uncouple the low frequency channel and deliver the output from the Y high frequency channel to the output device. In like manner the level sensing switch 168 normally couples the X low frequency channel output from the frequency comparator 151 to the X velocity output device, except when the high frequency channel output from the frequency comparator 137 exceeds a given level in either polarity. The switching level selected for the switches 167 and 168 depends on the maximum image velocity capable of being accurately measured in the low frequency channel. Using the examples already given herein, the low frequency channels can be used to measure frequency deviations of plus or minus 870 c.p.s. from the 1800 c.p.s. low frequency reference, and the high frequency channels can be used to measure deviations of plus or minus 30,000 c.p.s. from the 72,000 high frequency reference. Of course, the various circuit components are designed to handle these frequency ranges.

The height variation of terrain features within the field of view used for measuring image motion limits the accuracy of the measurement. In previous devices used to measure image motion, clouds lying within the field of view gave rise to erroneous measurements that would completely mask ground signals. However, the devices of this invention inherently suppress the effects of clouds because the involute reticle acts as a highly effective, narrow banded space filter that suppresses the low space frequencies of clouds that lack detail over relatively large areas and enhances higher space frequencies from finely detailed ground features. Furthermore, since the clouds are always closer than the ground, frequency selective circuits can be employed in the frequency comparators to emphasize the lower beat frequencies produced by ground details while suppressing the higher best frequencies produced by clouds. Of course, this type of frequency discrimination can only be partially effective, but does offer additional improvement in accuracy. Probably the most significant advantage over the prior art devices is the low cost and simplicity of the present device. The most expensive single component would be the multiple frequency involute reticle.

The accuracy of the image motion measurement depends upon the time constant of the integrator 102, which collects and averages the signals produced during a given interval. This interval, known as smoothing time, is directly related to the reciprocal of the frequency bandwidth. In accordance with well-known sampling theory, a frequency bandwidth excursion of 100 cycles per second can be produced by image motion in 0.01 second, and a bandwidth excursion of 30,000 cycles per second can be produced in 0.00003 second. Thus, approximately, image motion can be measured to an accurary of 100 cycles per second in 0.01 second, and to an accuracy of 30,000 cycles per second in 0.00003 second. In the practical examples discussed herein, an image motion measurement accuracy of 0.004 inch per second requires only one second at the extreme low end of the low frequency scale. On the other hand, a tenth of a percent accuracy at the higher end of the frequency range requires the frequency deviation to be determined to an accuracy of 0.72 cycle per second. This becomes feasible using a synchronous detector and requires only a 0.014 second integration interval.

Referring now to FIG. 6, the measured image motion velocities can be used for automatically producing precise image motion corrections in aerial photographic systems. An image motion meter 170 of the type previously described herein is securely mounted for movement with camera 171 within the aircraft. The camera 171 is illustrated with a portion of its outer casing broken away to show certain elements of the film drive mechanism within the camera magazine. A sprocketed drive wheel 173 that engages sprocket holes 174 on either edge of the flm 175 rotates in a counterclockwise direction to pull the film longitudinally in the direction shown by the arrow from a film magazine (not shown) across the region where the film is exposed by focusing the image thereon. The exposed film is wound upon a takeup reel 176 as it leaves the sprocketed drive wheel 173. In this illustration, the camera structure 171 is mounted by appropriate means within the aircraft so that the optical axis of its lens 177 will be vertical when the aircraft is in level flight. It will be understood by those skilled in the art that other appropriate arrangements may be constructed suitable for oblique camera systems.

The camera 171 is coupled by a shaft 178 held in a suitable bearing 179 for rotation in the horizontal plane by a reversible DC motor 180. Preferably the vertical axis of the shaft 178 coincides with the optical axis of the camera lens 177. The image motion meter 170 has its optical axis bore-sighted with that of the camera, or in some cases may actually shar the camera optics, and rotates with the camera. The narrow rectangular apertures in the field stop are aligned so that the Y orthogonal direction is precisely aligned along the longitudinal track of the film. The X velocity output from the image motion meter 170 is applied directly to the windings of the reversible DC motor 180 to cause it to rotate in a direction determined by the polarity of the applied signal. The rotational direction produced by the X velocity output is in the direction tending to reduce the amplitude of the output and continues until the output reaches zero. Thus, both the camera 171 and the image motion meter 170 are aligned with the true flight path so that there is no cross track vector of image motion. By eliminating the cross track or X vector, the entire image motion measured by the image motion meter is measured in the Y orthogonal direction which is aligned in the true direction of aircraft travel. Thus, precise image motion correction is achieved merely by controlling the longitudinal film speed along the actual direction of travel of the aircraft using the Y velocity output from the image motion meter 170 to control the rotational speed of the sprocketed drive wheel 173.

As shown in FIG. 6, the sprocketed drive wheel 173 is coupled by means of a shaft to be driven by a DC servo motor 182. A tachometer 184 is coupled to the other end of the shaft to generate a DC signal indicative of the instantaneous film speed. A speed servo circuit 185 compares the tachometer output with the Y velocity output from the image motion meter 170 to deliver a speed control error signal to the motor 182, thereby controlling the film speed to correct for image motion. However, conventional speed servo circuits of this type may not be capable of controlling very slow film speeds since most tachometers are inaccurate at such low speeds. Therefore, in most instances, it is preferable to employ arrangements such as those shown in FIGS. 7 and 8, in which very slow film speed can be measured in the same manner as image motion.

Referring now to FIG. 7, the film 175 records a latent image of the terrain during exposure in the region directly behind the camera lens 177 as it is driven longitudinally by the sprocketed drive wheel 173. The sprocket holes 174 on the film edges provide sharply detailed optical features that can be used in measuring the film motion optically. In case the film and platen are moved together, platen detail may be used as a target. However, the film or platen detail must be illuminated within the camera or magazine to permit the optical details to be seen by the detection apparatus, but without exposing the film or disturbing the latent image. As shown in FIG. 7, this is accomplished by illuminating the sprocket holes 174 on one edge of the film with infrared light having a wavelength to which the light sensitive agents in the film do not respond. The latent image on film may be deteriorated or even destroyed if exposed to certain wavelengths of infrared light due to what is commonly known as the Herschel effect. However, the incident energy required to produce the Herschel effect once the film has been exposed is many, many times larger than that required to produce an image initially. For pure silver bromide, the effective region of the Herschel effect occurs with wavelengths from 650 to 1100 millimicrons, and for most other sensitive materials at somewhat shorter wavelengths. The desired illumination is obtained by projecting the light energy obtained from a conventional tungsten bulb 187, which is a rich source of infrared radiation with wavelengths above 1100 millimicrons, through a pure silicon filter 188, which completely rejects radiations at wavelengths shorter than 1100 millimicrons, to illuminate the sprocket holes on one edge of the film. The pure silicon filter 188 may have a silicon oxide coating so that it exhibits a transmissivity of 0.9 or more throughout a good part of the infrared spectrum with wavelengths longer then the very short cutoff of 1100 millimicrons at the intrinsic absorption edge of pure silicon.

The image of the illuminated film edge is focused by a lens 189 through a narrow rectangular field stop aperture 190 onto a rotating involute reticle 191 in a strip tangent to the base circle of the involute pattern. The longitudinal axis of the narrow rectangular field stop opening 190 is aligned with the direction of film motion in the Y direction and permits the image of the sprocket holes to fall on the involute reticle 191. A planoconvex lens 192 located behind the involute reticle opposite the field stop opening 190 focuses the infrared light passing through the transparent areas of the reticle onto a photosensitive detector cell 193. As the involute reticle 191 rotates to chop the image detail, the photosensitive detector 193 generates an output frequency that is applied through a limiter and wave shaper circuit 194 to a frequency comparator 195, wherein it is compared with the carrier reference frequency. As previously explained, the carrier reference frequency can be derived by focusing a small spot of light through a tiny field stop opening 196 to be chopped by the rotating reticle at a substantially constant frequency. A lens 197 behind the reticle focuses the chopped light spot on a photosensitive detector cell 198, the output of which is provided through a limiter and wave shaper circuit 199 to the frequency comparator 195. The output of the frequency comparator circuit 195 is a DC signal directly proportional to the film speed, and by appropriate scaling can be compared with the Y velocity output from the image motion meter in a speed servo circuit 201 to produce a speed error signal for varying the rotational speed of a DC servo motor 182. By this means, the rotation of the sprocketed drive wheel 173 is continually and precisely controlled to match film speed to the image motion measured in the Y direction.

Figure 8:
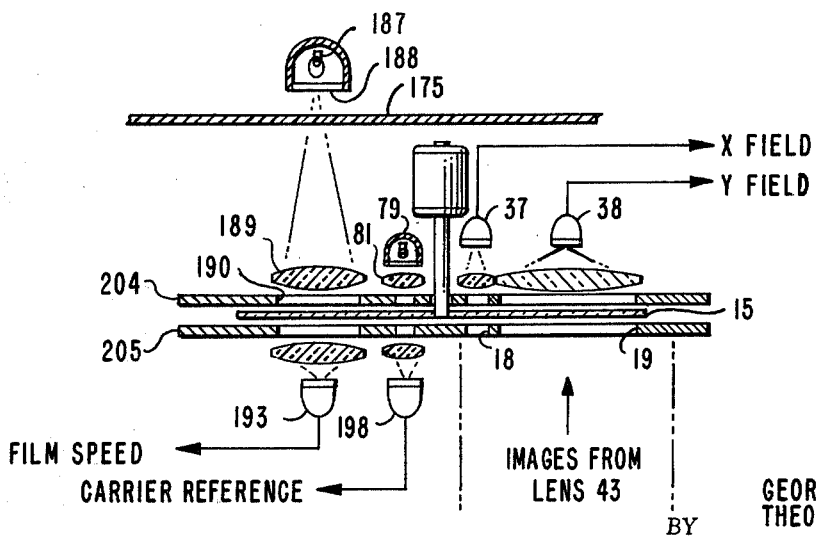
FIG. 8 illustrates schematically a portion of another preferred form of an image motion compensation system wherein the image motion and film speed are both measured using a single involute reticle.

As shown in FIG. 8, both film speed and image motion can be measured using a single rotating reticle 15, which in addition reduces the amount of circuitry required. The two images used for measuring image motion in the X and Y field take up only a portion of the reticle leaving the remainder free for use in measuring the film speed in the Y direction. A single field reticle 15, corresponding to that shown in FIGS. 1 and 2, is used to simplify the illustration, but it will be easily recognized that the principle is applicable to reticles designed to handle multiple speed ranges, such as that shown in FIG. 5. The images of the terrain from the lens arrangement 43 used for measuring image motion in the X and Y directions are focused on one side of the reticle 15 through the narrow rectangular openings 18 and 19 provided in a field stop 205 on one side of the reticle. The film image is focused on the other side of the reticle 15 on a different area through the narrow rectangular aperture 190 in a field stop 204. The apertures in the field stops 204 and 205 are substantially duplicated in the field stop on the other side of the reticle to permit light chopped by the reticle to reach the respective photosensitive cell located on the opposite side. Of course, it is understood that appropriate light baffles are employed to prevent light in the different paths from interfering. With this arrangement, it may be seen that the ground images and the film image are all chopped at the same frequency by the rotating reticle 15. Therefore, it is only necessary to generate a single carrier reference frequency by focusing a single light spot through the tiny field stop opening 196 onto some portion of the reticle 15.

Now, if the size of the image projected onto the reticle from the lens 43 is made exactly the same size as the image projected onto the film by the camera, and the film image is projected onto the reticle with a one-to-one magnification ratio, then the amplitude of the film speed signal should exactly match that of the image motion signal to achieve precise image motion. In other words, when the film 175 is moving at exactly the same speed and in the same direction as the image focused on the film, the images of the film and of the terrain are being chopped to produce exactly the same output frequency.

Referring now to FIG. 9, precise image motion correction can be achieved by matching the film speed to the image motion without actually measuring either film speed or image motion in the Y direction. This simplification is best accomplished if both the film and terrain images are chopped by the same reticle 15. The output frequencies from the photosensitive detector cells 38 and 193 are beat together in a frequency comparator 211 to produce an output signal indicative of the frequency difference that can be applied as a speed error signal to the motor 182 to control the film speed. If the size of the film image on the reticle 15 is matched with that of the ground image in the manner previously explained, then the frequency difference measured by the frequency comparator 211 would have an amplitude and polarity indicative of the film speed correction needed. Of course, when the film was moving at exactly the right speed to correct for image motion the frequency comparator output would be zero.

Referring now to FIG. 10, the relatively low cost and high accuracy of these image motion or V/H meters in accordance with this invention makes them extremely useful in airborne navigational systems, particularly for use in private aircraft where instrumentation costs must be held to a minimum. As previously explained in connection with FIG. 6, the cross track vector of image motion measured by the image motion meter 170 can be applied to the servo motor 180 causing the meter to rotate about its optical axis in the direction tending to reduce the measured cross track vector to zero. In this way, it operates as a null seeking servo to maintain the image motion meter 170 with its Y orthogonal direction exactly aligned with the true direction of travel of the aircraft. Without the camera used in the aerial photography system, the image motion meter 170 can be rotated about its optical axis by a shaft 213 coupled directly to the rotor of the servo motor 180. A pointer 214, aligned with the Y orthogonal direction of the meter and coupled by a shaft 215 to rotate therewith and mounted on the instrument panel of the aircraft, points in the true direction of travel. When used on the indicator face of a conventional gyro compass 216, the actual flight path is visually indicated as a compass bearing read at the tip of the pointer 214.

The Y velocity output, which measures the entire image motion from the cross track or X component at zero, is directly proportional to the velocity of the aircraft and inversely proportional to its altitude above the terrain. Therefore, if an accurate measure of the velocity or the height is available, the other can be computed. For example, presently available radar altimeters can accurately measure the height of an aircraft above the ground. If then the Y velocity output is combined with the output from such a precision altimeter 218 in an appropriate multiplier circuit 220, the resulting product is proportional to the true ground speed of the aircraft. This product can then be applied to operate a ground speed indicator 222. Also, with the true direction indicator 216, the computed ground speed may be used to operate a dead reckoning plotter 224 to produce a continuous trace of the path taken by the aircraft.

On the other hand, if an accurate indication of ground speed can be obtained from a precision speedometer 226, such as a Doppler radar, this can be divided by the Y velocity output in a divider 228 to produce an output proportional to the height of the aircraft above the terrain, which can then be used to operate a computer altitude indicator 230. However, instruments capable of precisely measuring ground speed tend to be complicated and expensive, making it preferable to measure altitude and compute ground speed.

Besides the particular application described herein, the image motion devices and systems described herein have many other potential uses and applications. For example, the image motion meter can serve as a precision drift meter for measuring the drift rate of a space vehicle during a landing approach to a lunar or planetary surface. These instruments can also be used as precision tachometers to measure or control the speed and direction of even very slow moving materials, such as the webs or belts used in the manufacturing processes or a high density tape recorder. Markings may be added to the body to provide the sharply detailed optical features if necessary. Moreover, these instruments can be operated to integrate a detected signal for relatively long periods of time to suit the available energy level. Therefore, the night time sensitivity of these instruments is comparable to that of a low level image orthogon used under the same nighttime conditions. Even in the total absence of visible light, image motion can be measured with a fair degree of accuracy from the infrared image of the terrain, so long as there is sufficient infrared detail, as over populated areas. Conventional high quality glass optics can be used to handle both visible and infrared images so long as care is taken to avoid light barium crowns which cut off infrared radiation wavelengths above about 2.2 microns. Most other glass optics pass infrared wavelengths up to about 2.5 microns with fair efficiency.

Image motion measurements made by the instruments described herein are effected by vibrations and other disturbances which can vary the optical axis in somewhat unpredictable fashion. The instruments and the associated equipment such as the cameras should thus be isolated as much as possible from these undesired motion disturbances by proper mounting. Soft foam rubber mounts alone provide a considerable degree of isolation from the higher frequency disturbances often encountered in airborne use. In addition, stabilized gimbal low frequency mounts or gas bearing similar to those used on precision gyroscopes can be used to obtain a much greater degree of isolation from the supporting structure so that vehicle dynamics have little effect on the accuracy.

For best results, the angular extent of the field of view should not be too large. Obviously, even though the altitude remains constant, the distance to a particular feature of the terrain increases with the angle between the line of sight and the vertical. In other words, assuming that the optical axis of the image motion meter is maintained vertical, the speed of image motion measured at the center of the image is slightly greater than at its edges. A field of view of approximately eight degrees is normally acceptable in image motion meters designed for airborne use. However, if the optical line of slight becomes inclined away from the vertical, the problem can become quite serious. Therefore, it may be desirable in some instances to maintain the optical axis vertically aligned by use of a gyroscopic control.

Although preferred embodiments and applications of the inventions have been described and illustrated herein, it will be understood that the invention is not limited thereto. Accordingly, any and all modifications, variations or equivalent arrangements falling within the scope of the annexed claims should be considered to be a part of the invention.

What is claimed is:

1. A system for passively measuring, from a given position, the relative velocity of an object per unit of distance between the given position and the object in two orthogonal directions, the object being presented as a focused image in a selected frequency region of the electromagnetic wave energy spectrum comprising means for projecting the object image along two parallel optical paths, a transparent rotating reticle having an alternately transparent and opaque involute spoke pattern thereon and disposed to intercept both optical paths, means disposed in both optical paths for defining elongated field stops lying normal to each other, the directions of elongation of the field stops and the involute pattern being such that rotation of the reticle provides an endless procession of transverse opaque spokes moving along the directions of elongation of each of the field stops, means disposed in the optical paths for generating signals corresponding to the object images after passage through the field stops in the reticle, and means responsive to the generated signals for providing signals representing $X/H$ and $Y/H$ where $X$ is the relative velocity of the object in one orthogonal direction, $Y$ is the relative velocity of the object in the other orthogonal direction and $H$ is the distance between the given position and the object.

2. The system of claim 1 wherein the means for providing the $X/H$ and $Y/H$ signals comprises means for projecting at least one beam of light along an optical path through the involute pattern of the reticle, means disposed in the optical path and responsive to the light beam for generating a reference signal corresponding to the light beam after passage through the pattern, and means for comparing each of the generated signals with the reference signal and producing output signals, the magnitude of which represents the frequency difference between the compared signals and the polarity of which represents the sense of the frequency relationship of the compared signals.

3. A system in accordance with claim 2 wherein the comparison means comprises means coupled to receive the reference signal and generated signals for converting the received signals into approximate sine waves, a pair of heterodyne mixers, each coupled to receive a different generated signal and the reference signal from the conversion means and providing a beat frequency signal equal to the frequency difference between the two received signals, means coupled to receive the beat frequency signal produced by each heterodyne mixer for producing pulses of predetermined magnitude and duration in response to successive complete cycles of the beat frequency signal, and integrating means coupled to the pulse producing means for providing an output representation of the frequency variations.

4. A system in accordance with claim 3 further comprising means for converting each of the generated signals and the reference signal into a direct current having a magnitude proportional to the signal, means for comparing the direct current corresponding to the reference signal with the direct current corresponding to each of the generated signals and for producing a signal the polarity of which represents the sense of the frequency relationship of the generated signal to the reference signal, and means coupled to the integrating means for indicating the polarity of the integrated signal in the integrating means in accordance with the polarity of the signal produced by the comparison means.

5. A system for passively measuring, from a given position, both large and small image motions of an object in two orthogonal directions, the object being presented along two optical paths as duplicate focused wave energy images in a selected frequency region of the electromagnetic wave energy spectrum comprising a mask having a separate pair of elongated slots and an aperture disposed in each of the paths, the axes of elongation of each pair of elongated slots being orthogonal; a transparent rotating reticle having a pair of opaque involute patterns thereon for respectively measuring large and small image motions, the reticle patterns being disposed such that when rotating each of the involute patterns presents an endless procession of spokes moving through both of the optical paths; means for projecting light beams along parallel axes through different ones of each of the apertures in the mask; means responsive to the light beams for generating reference signals; means disposed in the two optical paths for generating signal variations corresponding in time to the wave energy image variations after passage through the involute patterns; and a pair of means, each being coupled to receive the reference signals and the generated signal variations from a respective one of the opaque involute patterns and responsive to frequency variations therein for generating a pair of signals representative of the image motion of the object in the two orthogonal directions.

6. The system of claim 5 wherein the transparent rotating reticle comprises a transparent surface rotating about an axis normal to it, a first opaque base circle disposed on the transparent surface and concentric to the axis of rotation, a plurality of alternately transparent and opaque spokes of equal width emanating from the base circle in an involute pattern and terminating at a second opaque base circle larger than and concentrically disposed about the first base circle, and a second plurality of alternately transparent and opaque spokes of equal width, greater in number than the first plurality and emanating from the second base circle outward in an involute pattern; and wherein the axes of elongation of the portions of the focused images passed by two of the elongated slots in the mask are tangent to the inner base circle and the axes of elongation of the portions of the focused images passed by the other two elongated slots in the mask are tangent to the outer base circle.

7. A system for passively measuring, from a given position, the relative velocity of an object in two orthogonal directions, the object being presented along two parallel optical paths as focused wave energy images in a selected frequency region of the electromagnetic wave energy spectrum comprising means disposed in the optical paths for providing two patterns of alternating transmissivity characteristics in the selected frequency region, the patterns continuously moving across the focused images at different nominal rates in the two orthogonal directions presenting successive like cyclic variations across the images, means disposed in the optical paths for generating signals corresponding to the wave energy images after passage through said patterns, means for generating two reference signals, each varying in time response to the rate of passage of the successive like variations of a respective one of the patterns through the two optical paths, means for comparing each of the reference signals with the generated signals from the same pattern and producing signals representing their frequency differences, and means coupled to the comparing means for alternatively selecting a frequency difference signal from a respective one of the patterns which represents image motion in a selected orthogonal direction.

References Cited

UNITED STATES PATENTS

| | | | |
|---|---|---|---|
| 2,895,392 | 7/1959 | Habig | 95—12.5 |
| 2,950,663 | 8/1960 | Warshawsky | 95—12.5 |
| 2,959,375 | 11/1960 | Dunnegan | 244—14 |
| 3,006,235 | 10/1961 | Brandon | 88—1 |

JOHN M. HORAN, Primary Examiner

U.S. Cl. X.R.

250—233